United States Patent Office

3,481,911
Patented Dec. 2, 1969

3,481,911
CATALYST CONTAINING POLYHALOGEN COMPOUND FOR PRODUCTION OF AMORPHOUS 1-OLEFIN POLYMERS
Gerald R. Kahle and Ollie G. Buck, Bartlesville, Okla., assignors to Phillips Petroleum Company, a corporation of Delaware
No Drawing. Filed Mar. 12, 1964, Ser. No. 351,530
Int. Cl. C08f *1/56, 15/40*
U.S. Cl. 260—80.78     10 Claims

ABSTRACT OF THE DISCLOSURE

The formation of polymers and copolymers of 1-olefins in the presence of a catalyst system comprising an organometal halide and an alcoholate of a transition metal, the production of amorphous polymer is achieved by carrying out the reaction in the presence of an organic polyhalogen compound such as hexachlorocyclopentadiene, 1,2,3,4,7,7-hexachlorobicyclo(2,2,1) - hepta - 2,5 - diene, 1,2,4,5,6,7,8,8 - octachloro - 4,7 - methano - 3a,4,7,7a - tetrahydroindane, hexachloropropene, 2,3-dichloro-1-propene, 1,3-dichloro-1-propene, and 2,3-dibromo-1-propene.

---

This invention relates to a process for the production of amorphous 1-olefin polymers. In another aspect, this invention relates to a process for the production of amorphous 1-olefin polymers by the polymerization of 1-olefins in the presence of a novel catalyst comprising an organic polyhalogen compound and an alcoholate of a transition metal.

Conventionally, the polymerization of 1-olefins in the presence of a catalyst comprising an organometal halide with an alcoholate of a transition metal results in the production of plastic products which have a considerable degree of crystallinity. It has now been discovered that an organometal halide and an alcoholate of a transition metal can be employed in the polymerization of 1-olefins to produce amorphous homopolymers and copolymers of 1-olefins.

We have discovered that amorphous homopolymers and copolymers of 1-olefins are produced by the polymerization of 1-olefins in the presence of the catalyst system comprising (1) an organic polyhalogen compound selected from the group consisting of acyclic olefinic compounds and nonbenzenoid carbocyclic compounds, (2) an organometal halide, and (3) an alcoholate of a transition metal.

Accordingly, an object of our invention is to provide a process for the production of amorphous homopolymers and copolymers of 1-olefins.

Another object of our invention is to provide a process for the production of amorphous homopolymers and copolymers of 1-olefins employing a catalyst system comprising (1) an organic polyhalogen compound, (2) an organometal halide, and (3) an alcoholate of a transition metal.

Another object of our invention is to provide a novel polymerization catalyst.

Other objects, advantages and features of our invention will be readily apparent to those skilled in the art from the following description and the appended claims.

The amorphous 1-olefin polymers of this invention are preferably homopolymers and copolymers produced by the polymerization of 1-monoolefins containing from 2 to 8 carbon atoms per molecule. These amorphous 1-olefin polymers include polymers produced by the copolymerization of ethylene, propylene, or another 1-olefin, and a termonomer that will introduce unsaturation into the polymer chain. Representative 1-monoolefins useful in the process of this invention include ethylene, propylene, 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 5-methyl-1-hexene, 4-methyl-1-heptene, 5-methyl-1-heptene, 4,4-dimethyl-1-hexene, 6-methyl-1-heptene, 3,4,4-trimethyl-1-pentene, and the like, including mixtures of 2, 3 or more thereof.

The termonomers which can be copolymerized with ethylene and any of the above-described 1-monoolefins, according to this invention, include any of those known in the art, particularly those which impart ethylenic unsaturation to the polymer and enable the same to be vulcanized with sulfur. Representative termonomers are dicyclopentadiene, 1,4-pentadiene, 1,5-hexadiene, 2-methyl-1,5-hexadiene, 3,3-dimethyl-1,5-hexadiene, 1,7-octadiene, 1,9-decadiene, ethynyl ethylenes such as vinylacetylene and isopropenylacetylene, and certain of the fulvene class of compounds such as 6,6-dimethylfulvene, 6,6-diethylfulvene, and the like.

The catalyst systems of this invention are formed by admixing an organometal halide with an alcoholate of a transition metal and adding thereto an organic polyhalogen compound. The organometal halides correspond to the formula $R_xMX_y$, wherein R is a saturated acyclic hydrocarbon radical, a saturated cyclic hydrocarbon, an aromatic hydrocarbon radical, or mixtures of these radicals, M is a metal selected from the group consisting of aluminum, gallium, indium, and thallium, and X is a halogen. The $x$ and $y$ are numbers, and the sum of $x$ and $y$ is equal to the valence of the metal M. X can be any of the halogens, including chlorine, bromine, iodine, and fluorine. The saturated acyclic hydrocarbon radicals, the saturated cyclic hydrocarbon radicals, and the aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of organometal halides which are useful in the catalyst compositions of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $C_6H_{11}InBr_2$ (cyclohexane derivative, $C_{17}H_{35}TlI_2$, and $(CH_3)_2TlBr$. Sesquihalides such as ethylaluminum sesquichloride and butylaluminum sesquibromide are also applicable. Of the organometal halides that can be employed, organoaluminum halides are preferred.

The metal alcoholate components in the catalyst systems employed in this invention conform to the formula $M'(OR')_n$, wherein M' is a metal selected from the group consisting of titanium, zirconium, hafnium, and thorium R' is selected from the group consisting of alkyl, alkenyl, cycloalkyl, cycloalkenyl, and aryl radicals and combinations of two or more of these radicals, and $n$ is an integer equal to the valence of the metal M'. Each R' contains not more than 20 carbon atoms, preferably less than 10 carbon atoms, with the total number of carbon atoms in the compound not exceeding 80. Examples of metal alcoholates include the following: tetra-n-butyl titanate, tetraisopropyl titanate, tetra-2-ethylbutyl titanate, tetra-2-ethylhexyl titanate, tetraoctadecyl titanate, tetraeicosyl titanate, tetraethyl zirconate, tetramethyl zirconate, tetrabutyl zirconate, tetraisopropyl zirconate, tetra-1-cyclopentylallyl titanate, tetra-4-hexylisobutylzirconate, and the like. Also included are such compounds as $Hf(OCH_3)_4$, $Th(OC_3H_7)_4$, $Th(OC_6H_5)_4$, $Zr(OC_4H_7)_4$, $Th(OC_6H_{13})_4$, and $Zr(OC_{12}H_{25})_4$.

The mol ratio of the amounts of organometal halide to the Group IV metal alcoholates will normally be in the range of 0.5:1 to 20.0:1, preferably within the range of 1:1 to 10:1. The quantity of the reducible component of this invention which is used in the polymerization of olefins is normally within the range of 0.05 to 20 millimoles per 100 grams of total olefins charged to the reaction system.

Although not to be limited thereto, amorphous 1-olefin polymers produced by the process of this invention are produced in increased yields when the mixture of anorganometal halide and an alcoholate of a transition metal is aged prior to contacting the catalyst with the olefin or olefins to be polymerized. Excellent results are obtained by aging the mixture at a temperature in the range of 50 to 250° F. for a period of time in the range of 5 minutes to 8 hours. The aging treatment step is conducted in an inert atmosphere, such as nitrogen, and is normally conducted in the presence of a portion or all of the polymerization diluent.

The organic polyhalogen compounds which are employed in our invention are selected from the group consisting of acyclic olefinic compounds and non-benzenoid carbocyclic compounds. The acyclic olefinic compounds can be represented by the formula

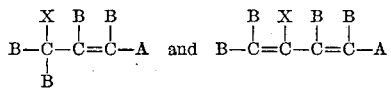

wherein X is a halogen selected from the group consisting of chlorine, bromine, and iodine, A is selected from the group consisting of hydrogen, chlorine, bromine, and iodine, B is selected from the group consisting of hydrogen, chlorine, bromine, iodine, and saturated and unsaturated aliphatic radicals, saturated and unsaturated cycloaliphatic radicals, and aromatic radicals, and at least one of A and B is halogen, and wherein at least two of the halogen atoms in the structure

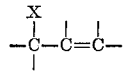

are positioned on different carbon atoms. The nonbenzenoid carbocyclic compounds can be represented by the structures

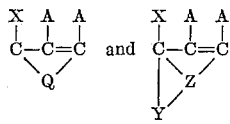

wherein X and A are as hereinbefore defined and Q, Y and Z are residues of carbocyclic ring structures which can contain substituents represented therein by B. The total number of carbon atoms in the organic polyhalogen compound generally will not exceed 20 and preferably will not exceed 10. Examples of suitable organic polyhalogen compounds (modifiers) include the following: 1,2,3-trichloropropene, 1,2,3-trichloro-3-bromopropene, hexachloropropene, 1,1,2,3-tetrachloro-1-butene, hexachlorobutadiene, hexachlorocyclopentadiene, 1,2,3-trichloro-5,5-dibromo-1,3-cyclopentadiene, 1,2,3,4,7,7-hexachlorobicyclo(2,2,1)hepta-2,5-diene, 1,2,4,5,6,7,8,8-octachloro-4,7-methano-3a,4,7,7a-tetrahydroindane (Chlorodane), 2,3-dichloro-1-propene, 1,3-dichloro-1-propene, 2,3-dibromo-1-propene, 2-bromo-3-iodo-3-methyl-1-pentene, 2-chloro-3-bromo-3,4-diphenyl-1-butene, 1,2,3-trichloro-4-cyclohexyl-1,3-butadiene, 1,2,3-tribromo-4-methyl-5-n-butyl-1,3-cyclopentadiene, 1,2-dichloro-3-iodo-4,6-diphenyl-1,3-cyclohexadiene, 1,3-dichloro-5,7-diisopropyl-1,3-octadiene, 1,2,3,4,7,7-hexachloro-5,6-diphenylbicyclo(2,2,1)hepta-2,5-diene, 1-iodo-2,3-dibromo-4-dodecyl-7-methylbicyclo(2,2,1)hepta-2,5-diene, 1,2-diiodo-3,4,10,10-tetrachloro-2,5,1-dec-2-ene, 1,2,3,10,10-pentabromo-5,9-dimethyl-6,8-di-tert-butyl-2,5,1-dec-2-ene, and 4,6-diiodo-5,7,8,8 - tetrachloro - 1,2,3,3a,7a - pentamethyl - 4,7-methano-3a,4,7,7a-tetrahydroindane.

When a polyhalogen compound of the type hereinbefore described is employed as a catalyst component in the polymerization of 1-olefins using an organometal halide-transition metal alcoholate mixture, the polymeric products are amorphous and not crystalline as is the case when the polyhalogen compound is not used. The amorphous polymers produced by the process of this invention range from very soft to rubbery polymers, depending to a degree upon the quantity of polyhalogen compounds utilized.

The amount of polyhalogen compound employed in the process of this invention is generally based on the transition metal alcoholate component of the catalyst and will normally be in the range of 0.1 to 10 mols, preferably from 0.25 to 5 mols, per mol of the metal alcoholate.

The relative percentages of the polymer prepared by the improved process of this invention which are attributable to each of the monomers employed can vary widely. Generally, the ethylene and higher 1-monoolefin comonomers will each make up from 20 to 75 weight percent of the polymer, and where a termonomer, such as dicyclopentadiene, is employed, will generally make up from 0.5 to 20 weight percent of the polymer. Of course, the nature of the polymer, that is, its molecular weight, and inherent viscosity, tensile strength, etc., will be dependent upon the monomeric materials charged and the relative ratios and the reaction conditions, and those skilled in the art of polymerization will be readily able by means of simple routine tests to determine what conditions are optimum for any particular polymer product desired.

The polymerization reaction of this invention is normally conducted in the liquid phase employing a diluent, or a mixture of diluents, in which the catalyst comonomer products are soluble. As such, the system can be described as a solution polymerization system. The polymerization reaction can also be carried out in bulk and slurry systems. The concentration of monomers in the solvent employed in the solution polymerization reaction will normally be in the range from about 1 to 30 weight percent. Where a termonomer is employed, it will be present generally in the solvent in the amount of about 0.02 to 10 weight percent. Solvents which can be employed in the polymerization reaction include any of those known in the prior art, and these solvents will usually be a hydrocarbon or halogenated hydrocarbon, such as propane, butane, hexane, benzene, toluene, xylene, tetrachloroethylene, cyclohexane, methylcyclohexane, chlorobenzene, o-dichlorobenzene, dichloromethane, 1,1,2,2-tetrachloroethane, and the like, or mixtures thereof. The product polymer will be soluble in the solvent and normally will be present in a concentration of 1 to 15 weight percent.

It has been found that various materials in some instances may have a tendency to inactivate the catalyst composition of this invention. These materials include carbon dioxide, oxygen and water. Therefore, it is usually desirable to free the monomers from these materials, as well as from other materials which tend to inactivate the catalyst, before contacting when the catalyst occurs. Any of the known means for removing such contaminants can be employed. The solvent employed in the polymerization process should also be free of contaminants, such as water, oxygen, and the like. It is desirable also that air and moisture be removed from the reaction vessel before the reaction is conducted. However, in some cases, small amounts of catalyst inactivating materials, such as oxygen or water, can be tolerated in the reaction mixture while still obtaining reasonably good polymerization rates. It is to be understood that the amount of such material present in the reaction mixture shall not be sufficient to completely inactivate the catalyst.

The polymerization conditions can vary widely, but generally the polymerization temperature will be in the range of 0 to 140° F., preferably in the range of 60 to 110° F. The reaction pressure, maintained by an inert atmosphere, such as nitrogen, will be that sufficient to maintain the reaction mixture in the liquid phase and is generally in excess of 100 p.s.i.g., preferably in excess of 250 p.s.i.g.

When the mixture of an organometal halide and an alcoholate of a transition metal employed in the polymerization reaction is subjected to an aging treatment step as previously described, the aging step is conducted in the absence of the polyhalogen compound. Preferably, the polyhalogen compound is in contact with the said mixture for no more than a few minutes prior to charging the monomer or monomers to the polymerization reaction zone.

Although not to be limited thereto, preferably the polyhalogen compound is charged to the reaction zone containing the diluent and organometal halide-transition metal alcoholate mixture. Thereafter, the monomer or monomers is charged to the reaction zone.

Following polymerization, the amorphous polymer product can be conventionally recovered from the effluent by coagulation with a nonsolvent, such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di-tert - butylhydroquinone, triphenylphosphite, heptylated diphenylamine, 2,2'-methylene-bis(4-methyl - 6 - tert-butylphenol), and 2,2,4-trimethyl-6-phenyl-1,2-dihydroquinoline.

Vulcanization or curing of the polymer as prepared by this invention can be conducted with conventional vulcanization procedures. Where sulfur is employed in the vulcanization of the polymers, the amount of sulfur utilized will generally be about 0.1 to 5 parts by weight per 100 parts polymer (phr.) and generally about 0.5 to 3 phr. The vulcanization can be effected, for example, at temperatures of 250 to 400° F. for 5 to 120 minutes. Peroxides, for example 0.1 to 10 phr., can be used for vulcanization, representative peroxides being bis(alpha, alpha-dimethylbenzyl) peroxide, diisopropyl peroxide, di-tert-butylperoxide, dibenzoyl peroxide, alpha,alpha-dimethylbenzyl hydroperoxide, tert-butyl perbenzoate, etc. Vulcanization accelerators, accelerator activators, reinforcing agents, extenders, plasticizers, antioxidants and fillers, like those agents employed in compounding natural and synthetic rubber, can also be employed. Fillers and reinforcing agents such as carbon black, clay, calcium silicate, talc, silica, whiting, and titanium dioxide, and plasticizers such as naphthenic and paraffinic oils, can be utilized in compounding the polymers of this invention. Such polymers will have molecular weights in the range of about 5,000 to 1,000,000 and can be used in fabricating such rubber goods and plastic products as coatings for electrical cable, window seals, garden hose, soles and heels, belts, coated fabrics, tires, films, coatings, containers (bottles), pipes, fibers, etc.

The objects and advantages of this invention are illustrated in the following examples, but it should be understood that the various materials employed in these examples, the conditions of operation, and other details should not be construed to unduly limit this invention.

EXAMPLE I

In this example, ethylene, propylene and dicyclopentadiene were copolymerized in the presence of hexachlorocyclopentadiene. The following recipe was employed:

| | |
|---|---|
| Toluene, ml. | 600 |
| Ethylaluminum sesquichloride, mmoles | 11.0 |
| Tetra-n-butyl titanate, mmoles | 2.0 |
| Hexachlorocyclopentadiene, mmoles | 30.0 |
| Dicyclopentadiene, mmoles | 30.0 |
| Propylene, grams | 50 |
| Ethylene, p.s.i.g. over reactor pressure | 20 |

A portion of the toluene (200 milliliters) was charged first to the reactor and was followed by the ethylaluminum sesquichloride and 100 milliliters more of the toluene. Tetra-n-butyl titanate was added and then another 100-milliliter portion of toluene was introduced into the 1-liter reactor. The mixture was aged 15 minutes at 125° F., cooled to 90° F., and the hexachlorocyclopentadiene charged to the reactor followed by dicyclopentadiene. Following the charging of each of the last two ingredients, 100 milliliters of toluene was introduced into the reactor. Propylene was introduced and finally the ethylene introduced until the pressure was 20 p.s.i.g. over the reactor pressure. The reactants were agitated throughout the run. Polymerization time was 2.5 hours and the temperature was maintained at 90° F.

The reaction was terminated with an isopropyl alcohol solution of the antioxidant, 2,2'-methylene-bis(4-methyl-6-tert-butylphenol), the amount employed being 1 part by weight per 100 parts by weight of the polymer. The polymer was then coagulated in isopropyl alcohol, separated and dried. Results were as follows:

| | |
|---|---|
| Polymer weight, grams | 26.7 |
| Inherent viscosity [1] | 1.3 |
| Toluene insolubles, wt percent [2] | 0 |
| Total unsaturation, mmoles ICl/g. polymer [3] | 0.39 |
| Propylene, wt. percent [4] | 50.0 |

[1] The inherent viscosity in this and subsequent examples was determined by placing 1/10 gram of polymer in a wire cage made from 80 mesh screen and placing the wire cage in 100 milliliters of toluene contained in a wide-mouth, 4-ounce bottle. After standing at room temperature (approximately 25° C.) for 24 hours, the cage was removed and the solution was filtered through a sulfur absorption tube of Grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[2] The quantity of toluene insolubles referred to in this and subsequent examples is that amount of material not dissolved after 0.2 gram sample of the polymer remains in contact with 100 milliliters of toluene at room temperature for 24 hours. The value should be below 50 weight percent for a rubbery polymer.

[3] In this and subsequent examples, the procedure employed to determine the total unsaturation by iodine chloride titration was as follows: A 0.5-gram sample of the polymer was dissolved in a 75/25 volume mixture of carbon disulfide and chloroform, a chloroform solution of iodine chloride of known concentration (approximately 0.09–0.10 molar) was added, the mixture was placed in 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

[4] In this and subsequent examples, an infrared procedure was employed to determine the weight percent propylene. A carbon tetrachloride solution of the polymer containing 1 gram of polymer per 100 milliliters solvent was used. The solution was placed in a 1500-micron cell and scanned for a peak at the 7.25 micron band using a commercial infrared spectrophotometer. The number of methyl groups N was obtained from the formula $$N = \frac{(14{,}000)(A_{7.25})(1{,}000)}{(C)(t)(\epsilon)} \quad \text{(I)}$$

14,000 = molecular weight of 1,000 methylene groups
$A_{7.25}$ = absorbance at the 7.25 micron band
$C$ = concentration of polymer solution in gram/liter
$t$ = cell thickness in centimeters
$\epsilon$ = specific extinction coefficient The specific extinction coefficient ($\epsilon = 28{,}700$) was determined using three samples of an ethylene/propylene copolymer of known propylene content as a reference material. The value was obtained by solving the equation $$\epsilon = \frac{(14{,}000)(A_{7.25})}{(d)(t)(N)} \quad \text{(II)}$$

$d$ = density of polymer solution on gm./cc. (assumed to be 0.9)
$t$ = thickness of absorbing layer of polymer in centimeters
$N$ = number of methyl branches in control polymer.

The percent propylene was calculated as follows:

$$\% = \frac{(N)(100)}{333} \quad \text{(III)}$$

In the Formula III, 333 is the number of methyl branches per 1,000 methylene groups.

The polymer was compounded using the following recipe:

| | Parts by weight |
|---|---|
| Polymer | 100 |
| High abrasion furnace black | 50 |
| Zinc oxide | 5 |
| Stearic acid | 1 |
| Circosol 2XH [1] | 20 |
| Sulfur | 1.5 |
| Captax [2] | 0.5 |
| Monex [3] | 1.5 |

[1] Petroleum hydrocarbon softener containing hydrocarbons of high molecular weight in the form of a heavy, viscous, transparent, pale green, odorless liquid of low volatility; sp. gr. 0.940; Saybolt Universal viscosity at 100° F., of about 2000 seconds.
[2] 2-mercaptobenzothiazole.
[3] Tetramethylthiuram monosulfide.

The compounded stock was cured 30 minutes at 320° F. The compounded stock had the characteristics of vulcanized rubber with a tensile strength of 2500 p.s.i. and an elongation of 770 percent.

EXAMPLE II

In this example, ethylene, propylene and dicyclopentadiene were copolymerized in the presence of hexachlorocyclopentadiene, ethylaluminum sesquichloride, and tetraisopropyl titanate. The recipe was as follows:

| | |
|---|---|
| Toluene, ml. | 200 |
| Ethylaluminum sesquichloride, mmoles | 2.5 |
| Tetraisopropyl titanate, mmols | 1.25 |
| Propylene, grams | 12.5 |
| Dicyclopentadiene, mmoles | 10 |
| Hexachlorocyclopentadiene, mmoles | 3.75 |
| Ethylene, p.s.i.g. over reactor pressure | 20 |

Toluene was introduced first into the reactor followed by the ethylaluminum sesquichloride and tetraisopropyl titanate. This mixture was aged 1.5 hours at 122° F. and then cooled to 90° F. after which propylene, dicyclopentadiene and hexachlorocyclopentadiene were introduced into the reactor in the order named. Ethylene was then introduced until the pressure had increased 20 p.s.i.g. over the reactor pressure. Polymerization time was 2 hours and the temperature was maintained at 90° F. The reactants were agitated throughout the run.

An amorphous polymer was recovered in the manner described in Example I. Upon analysis, the following results were obtained:

| | |
|---|---|
| Polymer weight, grams | 9.9 |
| Inherent viscosity | 0.50 |
| Toluene insolubles, wt. percent | 5 |
| Total unsaturation, mmoles ICl/g. polymer | 0.46 |
| Propylene, wt. percent | 74 |

EXAMPLES III

In this example, three different polyhalogen compounds were employed in reactions for the copolymerization of ethylene, propylene, and dicyclopentadiene using a catalyst formed on admixing ethylaluminum sesquichloride, tetraisopropyl titanate, and a polyhalogen compound. The runs were conducted substantially as described with respect to Example II. The runs are summarized in the following Table I.

TABLE I

| | Run No. 1 | Run No. 2 | Run No. 3 | Run No. 4 |
|---|---|---|---|---|
| Toluene, ml | 200 | 200 | 200 | 200 |
| Ethylaluminum sesquichloride, mmoles | 2.0 | 2.0 | 3.0 | 2.06 |
| Tetraisopropyl titanate, mmoles | 1.0 | 1.0 | 1.0 | 0.75 |
| Propylene, grams | 12.5 | 12.5 | 12.5 | 12.5 |
| Polyhalogen compound, mmoles: | | | | |
| 1,2,3,4,7,7-hexachlorobicyclo(2,2,1)hepta-2,5 diene | 8 | | | |
| 1,2,4,5,6,7,8,8-octachloro-4,7-methano-3a,4,7,7a-tetrahydro-indane | | 2.0 | | |
| Hexachloropropene | | | 4.0 | 4.0 |
| Dicyclopentadiene, mmoles | 8 | 8 | 8 | 8 |
| Ethylene pressure, p.s.i.g.[1] | 30 | 30 | 30 | 30 |
| Temperature, ° F | 90 | 90 | 90 | 90 |
| Time, hours | 2.5 | 2.5 | 2.5 | 2.5 |

[1] Reactor pressured with ethylene to value given.

In each run, an amorphous polymer was recovered in the manner described in Example I. The following results were obtained and are shown below in Table II.

TABLE II

| | Run No. 1 | Run No. 2 | Run No. 3 | Run No. 4 |
|---|---|---|---|---|
| Polymer weight, grams | 1.2 | 6.5 | 11.1 | 3.2 |
| Inherent viscosity | 0.67 | 0.73 | 0.57 | 0.54 |
| Toluene insolubles, Wt. percent | 11 | 7 | 13 | 1.0 |
| Total unsaturation, mmoles ICl/g. polymer | 0.53 | 0.35 | 0.35 | 0.35 |
| Propylene, Wt. percent | | 52 | 45 | 56 |

As previously noted, the charging procedure was essentially that employed in Example II, the order of the ingredients as listed in Table I being the order in which they were charged. All products were clearly amorphous as evidenced by the low values obtained for the toluene insoluble matter.

EXAMPLE IV

In this example, a series of runs was made employing different polyhalogen compounds in reactions for the copolymerization of ethylene, propylene, and dicyclopentadiene. A preformed organometal halide-transition metal alcoholate mixture was employed. These runs are summarized below in Table III.

TABLE III

| | Run No. 1 | Run No. 2 | Run No. 3 | Run No. 4 | Run No. 5 |
|---|---|---|---|---|---|
| Toluene, ml | 200 | 200 | 200 | 200 | 200 |
| Propylene, grams | 12.5 | 12.5 | 12.5 | 12.5 | 12.5 |
| Polyhalogen compound mmoles: | | | | | |
| 1,2,3,4,7,7-hexachlorobicyclo (2,2,1) hepta-2,5-diene | 2.0 | 8.0 | | | |
| 2,3-dichloro-1-propene | | | 8.0 | | |
| 1,3-dichloro-1-propene | | | | 1.0 | |
| 2,3-dibromo-1-propene | | | | | 0.5 |
| Dicyclopentadiene, mmoles | 8.0 | 8.0 | 8.0 | 8.0 | 8.0 |
| Organometal halide-transition metal alcoholate mixture, ml.[1] | 4.0 | 4.0 | 5.0 | 5.0 | 4.0 |
| Ethylene pressure, p.s.i.g.[2] | 20 | 20 | 20 | 20 | 20 |
| Temperature, ° F | 90 | 90 | 90 | 90 | 90 |
| Time, hours | 2 | 2 | 2 | 2 | 2 |

[1] Organometal halide-transition metal alcoholate mixture preparation for Runs 1, 2 and 5: 25 ml. of 0.79 M ethylaluminum sesquichloride and 7.5 ml. of 1.6 M tetraisopropyl titanate, each in toluene solution, were mixed and aged 30 minutes at 70° C. Aliquots of this mixture (4.0 ml.) were used in the three runs. Catalyst preparation for Runs 3 and 4: 29 ml. of 0.69 M ethylaluminum sesquichloride, 7.6 ml. of 1.5 M tetraisopropyl titanate (each in toluene solution), and 3.4 ml. additional toluene were mixed and aged 30 minutes at 70° C. Aliquots of this mixture (5.0 ml.) were used in Runs 3 and 4.
[2] Reactor pressured to 20 p.s.i.g. with ethylene.

The various ingredients were charged in the order listed. In each run an amorphous polymer was recovered as evidenced by the low values obtained for toluene insoluble matter as shown in the following Table IV.

TABLE IV

|  | Run No. 1 | Run No. 2 | Run No. 3 | Run No. 4 | Run No. 5 |
| --- | --- | --- | --- | --- | --- |
| Polymer weight, grams | 1.0 | 1.4 | 3.7 | 2.8 | 2.7 |
| Inherent viscosity | 0.40 | 0.45 | 0.79 | 0.61 | 0.51 |
| Toluene insolubles, wt. percent | 6.0 | 9.0 | 9.0 | 7 | 10 |
| Total unsaturation, mmoles ICl/g. polymer | 0.30 | 0.32 | 0.80 | 0.43 | 0.49 |
| Propylene, wt. percent |  | 65 |  | 75 | 62 |

As will be evident to those skilled in the art, various modifications of this invention can be made, or followed, in the light of the foregoing disclosure, without departing from the spirit or scope thereof.

We claim:

1. A process which comprises contacting in a polymerization zone at a temperature within the range of 0–140° F. and at a pressure sufficient to maintain the reaction mixture in a liquid phase, a feed comprising ethylene and a higher 1-monoolefin containing from 2 to 8 carbon atoms per molecule, with a catalyst formed on admixing an organometal halide, said metal selected from the group consisting of aluminum, gallium, indium and thallium; an alcoholate of a transition metal selected from the group consisting of titanium, zirconium, hafnium, and thorium; and an organic polyhalogen compound selected from the group consisting of hexachlorocyclopentadiene, 1,2,3,4,7,7 - hexachlorobicyclo(2,2,1)hepta - 2,5 - diene, 1,2,4,5,6,7,8,8 - octachloro - 4,7 - methano - 3a,4,7,7a-tetrahydroindane, hexachloropropene, 2,3-dichloro-1-propene, 1,3-dichloro-1-propene, and 2,3-dibromo-1-propene, the ratio of said polyhalogen to said alcoholate being within the range of 0.1 to 10 mols of polyhalogen per mol of alcoholate, and recovering from said process an amorphous polymer, said amorphous polymer being less than 50 weight percent toluene insoluble at room temperature.

2. The process of claim 1 wherein the organometal halide employed in the formation of said catalyst corresponds to the formula $R_xMX_y$, wherein R is a saturated acylic hydrocarbon radical, a saturated cyclic hydrocarbon radical, an aromatic hydrocarbon radical or mixtures of these radicals, M is a metal selected from the group consisting of aluminum, gallinum, indium and thallium, X is a halogen, $x$ and $y$ are numbers and the sum of $x$ and $y$ is equal to the valence of the metal M, and said alcoholate of a transition metal employed in the formation of said catalysts conforms to the formula $M'(OR')_n$, wherein M' is said transition metal, R' is selected from the group consisting of alkyl, alkenyl, cycloalkyl, cycloalkenyl and aryl radicals and combinations of two or more of these radicals, and $n$ is an integer equal to the valance of the metal M'.

3. In a process for the solution polymerization at a temperature within the range of 0 to 140° F. and at a pressure sufficient to maintain the reaction mixture in the liquid phase, of (1) ethylene, (2) at least one higher 1-monoolefin, and (3) a termonomer which imparts unsaturation to the resulting copolymer, the improvement comprising: conducting the polymerization process in the presence of a catalyst comprising an organometal halide, said metal selected from the group consisting of aluminum, gallium, indium and thallium; an alcoholate of a transition metal selected from the group consisting of titanium, zirconium, hafnium, and thorium; and an organic polyhalogen compound selected from the group consisting of hexachlorocyclopentadiene, 1,2,3,4,7,7 - hexachlorobicyclo - (2,2,1)hepta - 2,5-diene, 1,2,4,5,6,7,8,8-octachloro-4,7-methano-3a,4,7.7a-tetrahydroindane, hexachloropropene, 2,3-dichloro-1-propene, 1,3-dichloro-1-propene, and 2,3-dibromo-1-propene, the ratio of said polyhalogen to said alcoholate being within the range of 0.1 to 10 mols of polyhalogen per mol of alcoholate, and recovering from said solution polymerization process an amorphous polymer, said amorphous polymer having less than 50 weight percent toluene insolubles at room temperature.

4. The process of claim 3 wherein said higher 1-monoolefin is propylene, said termonomer is dicyclopentadiene, said organometal halide is ethylaluminum sesquichloride, said alcoholate of the transition metal is tetra-n-butyl titanate, and said organic polyhalogen compound is hexachlorocyclopentadiene.

5. A process according to claim 3 wherein said higher 1-monoolefin is propylene, said terpolymer is dicyclopentadiene, said organometal halide is ethylaluminum sesquichloride, and said alcoholate of said transition metal is tetraisopropyl titanate.

6. In a process which comprises introducing an organometal halide, said metal selected from the group consisting of aluminum, gallium, indium and thallium; and an alcoholate of a transition metal selected from the group consisting of titanium, zirconium, hafnium, and thorium into a polymerization zone for the polymerization of a monomer system comprising ethylene and at least one higher 1-monoolefin having 2 to 8 carbon atoms per molecule, aging said organometal halide and said alcoholate of a transition metal at a temperature in the range of 50 to 250° F. for a period of time in the range of 5 minutes to 8 hours, the improvement comprising introducing into said polymerization zone an organic polyhalogen compound selected from the group consisting of hexachlorocyclopentadiene, 1,2,3,4,7,7-hexachlorobicyclo (2,2,1)hepta-2,5-diene, 1,2,4,5,6,7,8,8 - octachloro - 4,7-methano-3a,4,7,7a-tetrahydroindane, hexachloropropene, 2,3-dichloro-1-propene, 1,3-dichloro-1-propene, and 2,3-dibromo-1-propene, maintaining said polymerization zone at a temperature within the range of 0 to 140° F. and at a pressure sufficient to maintain the reaction mixture in the liquid phase, the ratio of said polyhalogen to said alcoholate being within the range of 0.1 to 10 mols of polyhalogen per mol of alcoholate, and recovering from said polymerization zone an amorphous polymer, said amorphous polymer having less than 50 weight percent toluene insolubles at room temperature.

7. A process according to claim 6 wherein said aging process step is conducted in an inert atmosphere and in the presence of at least a portion of the polymerization diluent.

8. A polymerization catalyst comprising (1) an organometal halide corresponding to the formula $R_xMX_y$, wherein R is a saturated acylic hydrocarbon radical, a saturated cyclic hydrocarbon radical, an aromatic hydrocarbon radical or mixtures of these radicals, M is a metal selected from the group consisting of aluminum, gallium, indium and thallium, X is a halogen, $x$ and $y$ are numbers and the sum of $x$ and $y$ is equal to the valence of the metal M, (2) an alcoholate of a transition metal conforming to the formula $M'(OR')_n$, wherein M' is a metal selected from the group consisting of titanium, zirconium, hafnium and thorium, R' is selected from the group consisting of alkyl, alkenyl, cycloalkyl, cycloalkenyl and aryl radicals and combinations of two or more of these radicals, and $n$ is an integer equal to the valence of the metal M', and (3) an organic polyhalogen compound selected from the group consisting of hexachlorocyclopentadiene, 1,2,3,4,7,7 - hexachlorobicyclo(2,2,1)hepta - 2,5 - diene, 1,2,4,5,6,7,8,8-octachloro - 4,7 - methano-3a,4,7,7a-tetrahydroindane, hexachloropropene, 2,3-dichloro-1-propene, 1,3-dichloro-1-propene, and 2,3-dibromo-1-propene, the ratio of said polyhalogen compound to said alcoholate being within the range of 0.1 to 10 mols of polyhalogen per mol of alcoholate.

9. The catalyst according to claim 8 wherein the mol ratio of said organometal halide to said metal alcoholate is in the range of 0.5:1 to 20.0:1.

10. The catalyst according to claim 8 wherein said organometal halide is ethylaluminum sesquichloride, and wherein said alcoholate of a transition metal is selected from the group consisting of tetraisopropyl titanate and tetra-n-butyl titanate.

References Cited

UNITED STATES PATENTS

| | | | |
|---|---|---|---|
| 3,385,841 | 5/1968 | Bruton | 260—93.5 |
| 3,029,231 | 4/1962 | Amerongen. | |
| 3,101,327 | 8/1963 | Lyons. | |
| 3,211,709 | 10/1965 | Adamek et al. | 260—80.5 |
| 3,251,901 | 5/1966 | Bacskai. | |

JOSEPH L. SCHOFER, Primary Examiner

R. S. BENJAMIN, Assistant Examiner

U.S. Cl. X.R.

252—431, 429; 260—88.2